United States Patent [19]

Kwok et al.

[11] 4,267,856
[45] May 19, 1981

[54] FLUID OSCILLATOR

[75] Inventors: Clyde C. K. Kwok, Montreal; Leszek Suchy, St. Bruno, both of Canada

[73] Assignee: Edward V. Rippingille, Jr., Key Largo, Fla.

[21] Appl. No.: 1,971

[22] Filed: Aug. 14, 1978

Related U.S. Application Data

[63] Continuation of Ser. No. 669,013, Aug. 18, 1976, abandoned.

[30] Foreign Application Priority Data

Feb. 20, 1976 [CA] Canada ............................. 246237

[51] Int. Cl.² ........................................... G09D 11/03
[52] U.S. Cl. ................................. 137/119; 137/829; 137/830
[58] Field of Search ................... 137/112, 119, 516.11, 137/517, 519.5, 533.11, 539, 829, 830, 831, 827, 872; 116/65, 112, 117 B, 137 R, 274; 46/179, 180, 181

[56] References Cited

U.S. PATENT DOCUMENTS

| | | | |
|---|---|---|---|
| 443,532 | 12/1890 | Lund, Jr. ............................... | 137/119 |
| 2,322,658 | 6/1943 | Overbeke ............................... | 251/359 |
| 2,696,218 | 12/1954 | Fanshier ............................... | 116/112 |
| 3,125,112 | 3/1964 | Fitzmaurice ........................... | 137/119 |
| 3,342,198 | 9/1967 | Groeber ............................... | 137/829 |
| 3,444,881 | 5/1969 | Harper ............................... | 137/533.11 |
| 3,453,893 | 7/1969 | Ponterio ............................... | 137/829 |
| 3,659,433 | 5/1972 | Shaw ............................... | 137/517 |
| 4,005,726 | 2/1977 | Fowler ............................... | 137/119 |

FOREIGN PATENT DOCUMENTS

| | | | |
|---|---|---|---|
| 1028927 | 2/1976 | Canada ............................... | 137/119 |
| 1230822 | 5/1971 | United Kingdom ............................... | 137/119 |
| 1235456 | 6/1971 | United Kingdom ............................... | 137/119 |

*Primary Examiner*—William R. Cline
*Assistant Examiner*—H. Jay Spiegel

[57] ABSTRACT

A fluid oscillator is shown for producing pulsations in a flow of fluid. The oscillator has a housing which includes a fluid inlet channel for connection to a supply of fluid under pressure, a fluid outlet channel, and a valve chamber located between and communicating with said channels. A valve element is movably located in the valve chamber to alternatively block and unblock the outlet channel to produce the pulsating flow. The valve element moves to a blocking position by a reduction in fluid pressure at the valve element adjacent to the outlet channel. This reduction in pressure is partly caused by the fluid flowing past the valve element from the inlet channel to the outlet channel. The outlet channel is dimensioned so that the inertia of the fluid therein produces a further reduction in fluid pressure at the valve element adjacent to the outlet channel, which further reduction in pressure also holds the valve element firmly in the blocking position. This further reduction in pressure dissipates after the valve element reaches the blocking position. Bias means then causes the valve element to move to the unblocking position to repeat the cycle, resulting in pulsations of flow through the outlet channel.

5 Claims, 7 Drawing Figures

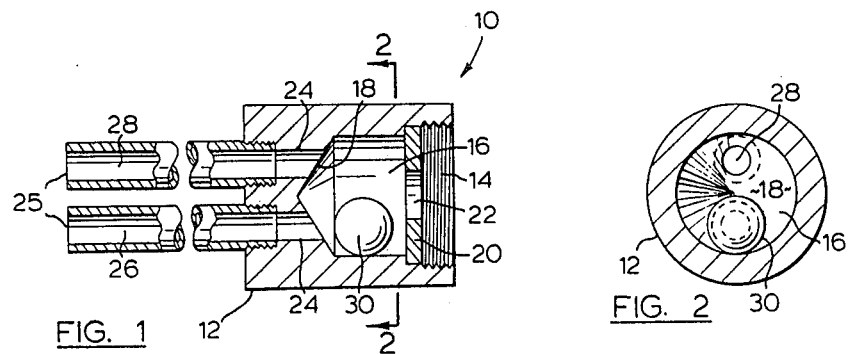
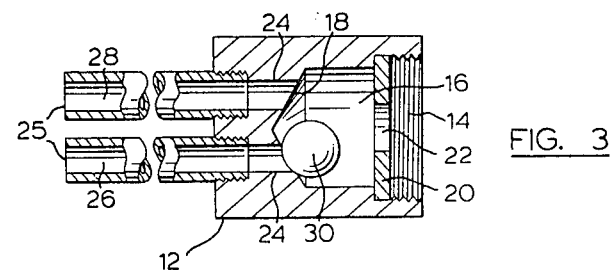
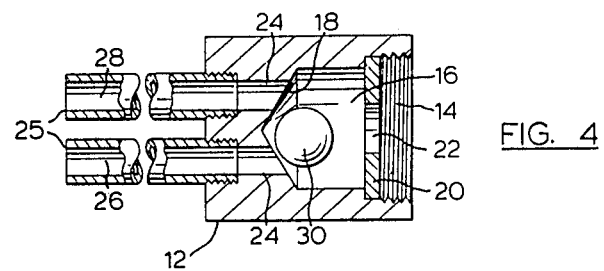
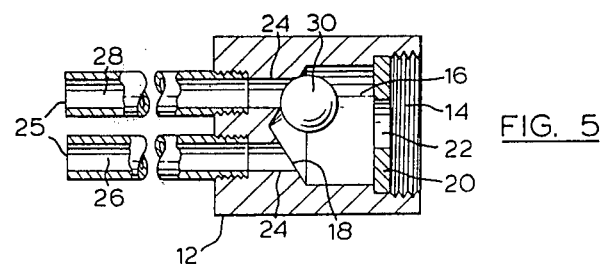

FLUID OSCILLATOR

This is a continuation of application Ser. No. 669,013, filed Aug. 18, 1976 now abandoned.

This invention relates to an improved fluid oscillator for producing periodic fluid pulsations, and in particular, to a fluid oscillator for producing a pulsating liquid flow.

Many different types of devices have been made in the past for producing a pulsating fluid flow. These devices usually have some type of valve which periodically interrupts flow through the device or diverts flow from one output channel to another output channel. The valve is often mechanically or electrically operated, but some of these devices utilize fluid dynamic effects to operate the valve, such as the diversion of flow within the device to operate the valve. A difficulty with these devices is that the valve members and their actuators are often complicated structures which are expensive to produce, especially if close tolerances are required in order to achieve satisfactory results.

One device that has a somewhat simpler valve arrangement for diverting flow between two output channels is shown in U.S. Pat. No. 443,532, issued to E. Lund, Jr. for an invention entitled PULSOMETER. The valve arrangement of this patent overcomes to some extent the problem of close manufacturing tolerances, however a difficulty with this device is that the valve is sensitive to gravity, and therefore means must be provided for adjusting the position of the valve so that it will operate properly. In addition, the device shown in this patent depends upon the condensation of steam to operate the valve, so this valve could not be used to control the flow of other fluids, and in particular liquids.

In the present invention, a fluid oscillator of simple construction utilizes the inertia of the fluid flowing therein to operate a valve element to produce pulsating fluid flow.

A fluid oscillator according to the present invention includes a housing defining a fluid inlet channel, a fluid outlet channel, and a valve chamber located between and communicating with said channels, the inlet channel being adapted to be connected to a supply of fluid under pressure. A valve element is movably located in the valve chamber. The valve element is dimensioned so that fluid flowing therepast from the fluid inlet channel to the fluid outlet channel produces a reduction in fluid pressure at the valve element adjacent to the outlet channel, thereby tending to cause the valve element to move to a blocking position to block said outlet channel. The outlet channel is dimensioned so that the inertia of the fluid therein causes a further reduction in fluid pressure at the valve element adjacent to the outlet channel after the valve element commences to move toward the blocking position, so that the valve element is held momentarily in the blocking position. This further reduction in pressure substantially dissipates after the valve element reaches the blocking position. Also, means are provided for biasing the valve element to move to an unblocking position to unblock said outlet channel after the valve element reaches said blocking position.

A preferred embodiment of the invention will now be described, by way of example, with reference to the accompanying drawings in which:

FIG. 1 is a sectional view of a preferred embodiment of a fluid oscillator according to the invention;

FIG. 2 is a sectional view taken along lines 2—2 of FIG. 1;

FIG. 3 is a sectional view similar to FIG. 1 showing the valve element blocking a first outlet channel;

FIG. 4 is a view similar to FIG. 1 showing the valve element moving between the first outlet channel and a second outlet channel;

FIG. 5 is a sectional view similar to FIG. 1 showing the valve element blocking the second outlet channel.

FIG. 6 is a sectional view similar to FIG. 2 showing another embodiment of fluid oscillator having a wedge-shaped bottom surface; and FIG. 7 is a partial sectional side view taken along lines 7—7 of FIG. 6.

Referring to the drawings, a preferred embodiment of a fluid oscillator is generally indicated by reference numeral 10. Oscillator 10 includes a housing 12 which is generally cylindrical having a generally cylindrical central bore forming a fluid inlet channel 14 and a valve chamber 16. The part of this central bore forming inlet channel 14 is threaded so that it may be coupled to a supply of fluid under pressure, such as a conventional water faucet. Valve chamber 16 has a conical bottom surface 18, the angle of the cone being approximately 120 degrees in the preferred embodiment. A disc-shaped retaining element 20 is located between valve chamber 16 and inlet channel 14. Retaining element 20 has a central circular opening or inlet port 22 which is part of inlet channel 14. The purpose of retaining element 20 will be discussed below.

Housing 12 is also formed with a pair of cylindrical outlet channels 24 which communicate with valve chamber 16 through conical bottom surface 18. Outlet channels 24 are generally symmetrically located about the central longitudinal axis of housing 12. Tubes 25 are threaded into outlet channels 24 to form a first fluid outlet channel 26 and a second fluid outlet channel 28. Outlet channels 26, 28 are typically about 7 millimeters in diameter. The length of outlet channels 26, 28 is variable, as discussed further below, but a typical length of these channels is 25 centimeters.

A freely movable valve element 30 is located inside valve chamber 16 and is adapted to block or prevent fluid from flowing through outlet channels 26, 28. Valve element 30 is a spherical ball, typically about 15 millimeters in diameter, and is formed of rubber or other resilient material which is capable of providing an effective seating action when blocking outlet channels 26, 28. Retaining element 20 prevents valve element 30 from coming out of valve chamber 16, since the diameter of inlet port 22 is slightly smaller than the diameter of valve element 30.

The operation of fluid oscillator 10 begins when fluid under pressure, such as water from an ordinary domestic water supply system, enters inlet channel 14. If the oscillator is in the position shown in FIG. 1, this water begins to flow through both the first and second outlet channels 26, 28. As a result of flow turbulence or slight asymmetry in the fluid flow, the water flowing in valve chamber 16 causes valve element 30 to move and abruptly block one of the fluid outlet channels, such as first outlet channel 26, as shown in FIG. 3. However, it will be appreciated that the flow through outlet channel 26 cannot be stopped instantaneously, because of the inertia of the fluid that was flowing therein. The result is a momentary partial vacuum or reduction in fluid pressure in channel 26 adjacent to valve element 30, which holds valve element 30 tightly in the blocking position.

When valve element 30 abruptly blocks one outlet channel, this closure produces a sudden increase in the impedance or resistance of the outflow and a sudden momentary pressure rise or pressure wave in valve chamber 16. This sudden pressure rise is sometimes referred to as "water hammer" and causes an increase in output flow through the unblocked outlet channel resulting in an output flow through this channel which is considerably higher than would be produced by the normal fluid supply pressure. In other words, there is an amplification effect wherein the unblocked outlet channel discharges a jet of fluid with a maximum velocity higher than that normally possible with just the constant supply pressure. It should be noted that the flow restrictions in fluid inlet channel 14 (primarily inlet port 22), are dimensioned so that the flow resistance in each outlet channel is less than the flow resistance in the inlet channel. This ensures that the flow in an unblocked outlet channel will increase after valve element 30 reaches a blocking position with respect to a blocked outlet channel and that generally no unwanted back pressures are produced in the inlet channel.

In addition to this "amplification effect" discussed above, as soon as the motion of the fluid in the first outlet channel is brought to a halt, the fluid in channel 26 tends to start moving back toward valve element 30 due to the pressure differential between the ambient pressure at the free end of channel 26 and the partial vacuum created as a result of the inertia of the fluid in channel 26, as discussed above. This "backward" fluid movement generates a positive pressure wave which helps to push valve element 30 away toward a blocking position with respect to second outlet channel 28 (and toward an unblocking position with respect of first outlet channel 26). The partial vacuum or "inertia effect", which first holds valve element 30 tightly in the blocking position and then pushes the valve element toward the unblocking position, substantially dissipates as the valve element is "pushed" away toward second channel 28. The time required for the dissipation of the partial vacuum or inertia effect in outlet channel 26 depends primarily upon the geometrical configuration of outlet channel 26, since this governs the inertia of the fluid in channel 26. This dissipation time also affects the frequency of oscillation of oscillator 10, as will be discussed further below.

Immediately after valve element 30 blocks one outlet channel, as shown in FIG. 3, all of the fluid output flows around valve element 30 and out through the unblocked outlet channel (second outlet channel 28, as seen in FIG. 3). This fluid flow causes a decrease or reduction in fluid pressure at valve element 30 adjacent to this unblocked outlet channel, because the cross-sectional flow area there is decreased or narrowed, and a sort of venturi effect or "lift" is produced adjacent to outlet channel 28. This reduction in fluid pressure, coupled with the "push" the valve element receives from the inertia effect discussed above, tends to cause valve element 30 to move toward and block the previously unblocked outlet channel (second outlet channel 28). FIG. 4 shows valve element 30 in an intermediate position as it is moving to block second outlet channel 28 and unblock first outlet channel 26.

As valve element 30 starts to move toward a blocking position with respect to second outlet channel 28, the fluid flow rate in second outlet channel 28 decreases, but the inertia of the fluid flowing in outlet channel 28 tends to resist the decrease in flow. This resistance to the decrease in flow causes a further reduction in fluid pressure in second outlet channel 28, and in the valve chamber at the valve element adjacent to the second outlet channel. This further reduction in pressure caused by flow inertia in second outlet channel 28 causes valve element 30 to abruptly close or block flow through outlet channel 28 (see FIG. 5). It will be appreciated, however, that as in the case with outlet channel 26 discussed above, the flow through outlet channel 28 cannot be stopped instantaneously because of the inertia of the fluid that was flowing therein. The result is that this inertia produces a momentary partial vacuum in channel 28 adjacent to valve element 30 which holds valve element 30 tightly in the blocking position.

Again, as soon as the motion of the fluid in second outlet channel 28 is brought to a halt, the partial vacuum or inertia effect causes a "backward" fluid movement generating a positive pressure wave which helps to push valve element 30 away toward a blocking position with respect to first outlet channel 26 (and toward an unblocking position with respect to second outlet channel 28). As before, the fluid flow past the valve element from the inlet channel to outlet channel 26 produces a reduction in fluid pressure or venturi effect at the valve element adjacent to outlet channel 26, thereby tending to cause the valve element to move to a blocking position with respect to outlet channel 26. Again, as valve element 30 moves toward outlet channel 26 and the flow through first outlet channel 26 is decreased, the inertia of the fluid therein produces a further reduction in pressure causing valve element 30 to quickly close and block first outlet channel 26.

When valve element 30 reaches the blocking position with respect to channel 26, there is again a sudden pressure rise in valve chamber 16 resulting in a high velocity pulse of fluid flow in second outlet channel 28. Also, a momentary partial vacuum is again produced in first outlet channel 26 to hold valve element 30 tightly in the blocking position. As this partial vacuum dissipates and a "backward" flow occurs in outlet channel 26, a reduction in fluid pressure once again occurs adjacent to second outlet channel 28 caused by the "venturi effect", and valve element 30 again starts to move toward second outlet channel 28. The result is that valve element 30 alternatively blocks and unblocks each outlet channel producing alternate pulsations in fluid flow in both outlet channels.

The frequency of oscillation or the frequency of the flow pulsations produced by oscillator 10 depends upon the pressure of the fluid supply and the dimensions of the fluid passages in oscillator 10. The frequency of oscillation may be changed simply by adjusting or altering the geometric configuration of the fluid outlet channels, for example by replacing tubes 25 with tubes of different lengths or diameters. Increasing the length of the outlet channels increases the inertia of the fluid flowing therein. This normally increases the duration of the partial vacuum created when valve element 30 reaches the blocking position. An increase in the duration of this partial vacuum usually decreases the frequency of oscillation of oscillator 10.

By way of illustration, the frequency of oscillation of oscillator 10 may be varied by changing the length of the outlet channels as follows:

| Length of Outlet Channels (cms) | Frequency (Hz) |
|---|---|
| 15.24 | 26.0 |
| 30.48 | 22.5 |
| 45.72 | 19.1 |
| 60.96 | 10.8 |

Having described a preferred embodiment of the invention, it will be appreciated that various modifications may be made to the structure described above. For instance, the oscillator described above can be made in any convenient size depending upon the fluid being used. As an example, oscillators operating with water can be made having an overall length varying from a few centimeters to several meters. Almost any type of material can be used in the construction of the fluid oscillator described above. Plastic is preferred, but metal may be used if desired.

If desired, one of the fluid outlet channels could be eliminated, so that the oscillator would have only a single outlet channel. In this case bias means would be provided for moving the valve element to the unblocking position to unblock the outlet channel after the valve element reaches the blocking position. The bias means could be a spring connected between the valve element and the housing inside the valve chamber to exert a force on the valve element to move the valve element toward the unblocking position. Conversely, the oscillator could have more than two outlet channels. If more than two outlet channels are used, it may be desirable to make some minor design modifications to the housing to bias the valve element to sequentially block each outlet channel, or the valve element could move freely to randomly block the various outlet channels.

As discussed above, the frequency of oscillation is a function of the length or geometrical configuration of the outlet channels. In an oscillator having more than one outlet channel, the outlet channels could be made of different lengths, so that each channel would have a different pulse duration. Also, the outlet channels do not have to be precisely symmetrically located in the oscillator to make the oscillator work effectively.

Where there are two or more outlet channels, the outlet channels could be merged using V-shaped tubular members to produce, in effect, a single outlet channel. However, if the outlet channels are 50 percent out of phase, a single or continuous output flow would result. Also, it is possible that the output flows could overlap or be out of phase in such manner than undesirable violent flow effects could result.

It will be appreciated that the valve element could be of some other shape than spherical, and the conical bottom surface of the valve chamber could be another shape, such as wedge-shaped as shown in FIGS. 6 and 7, as long as an effective blocking of the outlet channels results. The valve element also does not have to be made of rubber, but could be made of other resilient or non-resilient material, such as metal.

It will be appreciated that the oscillators described above may be used with various fluids, either gases or liquids. When used with liquids, such as water, the oscillators may be employed in such devices as pulsating shower heads, pulsating dental syringes, irrigation equipment, lawn sprinklers, or almost any type of equipment requiring a pulsating flow. The oscillators of the present invention are simple and do not require close tolerances in manufacture, making them inexpensive and easy to produce.

The embodiments of the invention in which an exclusive property or privilege is claimed are defined as follows:

1. A fluid oscillator for producing pulsations in a flow of fluid comprising:
   (a) a housing defining a fluid inlet channel, first and second similar fluid outlet channels each of which exhibits less resistance to fluid flow than the inlet channel, a valve chamber located between and communicating with said channels, the valve chamber including a surface defining first and second valve seats where the respective outlet channels meet the valve chamber, said inlet channel being adapted to be connected to a supply of fluid under pressure to direct this flow generally towards said surface and said outlet channels communicating with atmosphere;
   (b) a freely movable spherical valve element contained loosely in said valve chamber and dimensioned to alternately engage said valve seats and seal the respective outlet channels, the valve seats being positioned adjacent one another and opposite said inlet channel whereby, with the valve element located on a first of the valve seats, fluid flowing towards the second of the outlet channels will entrap the valve element and move the element with this fluid on to said second valve seat whereupon fluid will then flow towards the first of the valve seats and then entrap the valve element to return the valve element to the first valve seat, such movements of the element being repeated as long as fluid flows so that fluid leaving by way of the first and second outlet channels will pulsate.

2. A fluid oscillator as claimed in claim 1 wherein said surface is conical.

3. A fluid oscillator as claimed in claim 1 wherein said surface is wedge-shaped.

4. A fluid oscillator as claimed in claim 1 wherein the geometrical configuration of the outlet channels is adjustable to vary the frequency of pulsations of fluid flow.

5. A fluid oscillator as claimed in claim 2 in which the conical surface and the positions of the valve seats are symmetrical about the centre line of the inlet channel.

* * * * *